United States Patent
Subhedar et al.

(10) Patent No.: US 11,327,471 B2
(45) Date of Patent: May 10, 2022

(54) BUILDING AND TRACKING OF AN AUTOMATION ENGINEERING ENVIRONMENT

(71) Applicant: Siemens Aktiengesellschaft, Munich (DE)

(72) Inventors: Amey Pramodrao Subhedar, Cypress, CA (US); Rami Reuveni, Irvine, CA (US); Attila Labas, Rancho Mission Viejo, CA (US); Andreas Wannagat, Neuss (DE); Joerg Hanisch, Anaheim, CA (US); Karoly Arpad Kiraly, Rancho Mission Viejo, CA (US)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 16/757,802

(22) PCT Filed: Oct. 24, 2018

(86) PCT No.: PCT/EP2018/079146
§ 371 (c)(1),
(2) Date: Apr. 21, 2020

(87) PCT Pub. No.: WO2019/081574
PCT Pub. Date: May 2, 2019

(65) Prior Publication Data
US 2021/0373536 A1    Dec. 2, 2021

Related U.S. Application Data

(60) Provisional application No. 62/577,598, filed on Oct. 26, 2017.

(51) Int. Cl.
G05B 19/41    (2006.01)
G05B 19/418   (2006.01)

(52) U.S. Cl.
CPC ......... *G05B 19/4185* (2013.01); *G05B 2219/31229* (2013.01)

(58) Field of Classification Search
None
See application file for complete search history.

(56) References Cited

U.S. PATENT DOCUMENTS

2004/0225960 A1* 11/2004 Parikh ................. G06F 8/38
                                              715/243
2005/0159932 A1*  7/2005 Thurner ........... G05B 19/0426
                                              703/2

(Continued)

FOREIGN PATENT DOCUMENTS

WO    2016/171663    10/2016

OTHER PUBLICATIONS

PCT International Search Report, dated Feb. 21, 2019 based on PCT/EP2018/079146 filed Oct. 24, 2018.

*Primary Examiner* — Philip Wang
(74) *Attorney, Agent, or Firm* — Cozen O'Connor

(57) ABSTRACT

A non-transitory computer-readable storage medium, a system and method for automatically updating a multi-hierarchal representation of the system when building and tracking an automation engineering environment, wherein navigation schemes that automatically search for and connect to engineering objects based on predefined relations in multi-dimensional hierarchies are defined within an engineering object of the automation project in order to react to changes within a multi-disciplinary automation project, where the engineering object also includes an intelligent extraction port that automatically extracts predefined property data from a source engineering object when the source engineering object is connected to the engineering object.

22 Claims, 10 Drawing Sheets

(56) References Cited

U.S. PATENT DOCUMENTS

| | | | |
|---|---|---|---|
| 2013/0085588 A1* | 4/2013 | Brun | G05B 15/02 |
| | | | 700/97 |
| 2013/0169681 A1* | 7/2013 | Rasane | G06Q 50/10 |
| | | | 345/633 |
| 2013/0179519 A1* | 7/2013 | Drath | G06Q 10/06 |
| | | | 709/206 |
| 2014/0149882 A1* | 5/2014 | Nysetvold | G06F 30/17 |
| | | | 715/751 |
| 2016/0085520 A1* | 3/2016 | Zhao | G06F 8/34 |
| | | | 717/105 |
| 2016/0154910 A1* | 6/2016 | Altare | G06Q 50/04 |
| | | | 703/13 |
| 2016/0154913 A1* | 6/2016 | Altare | G06Q 50/04 |
| | | | 703/13 |
| 2018/0101164 A1* | 4/2018 | Noetzelmann | G05B 19/4188 |
| 2018/0107195 A1* | 4/2018 | Noetzelmann | G05B 19/418 |
| 2018/0136910 A1* | 5/2018 | Noetzelmann | G05B 19/41845 |
| 2018/0157735 A1* | 6/2018 | Noetzelmann | G06Q 10/06 |
| 2018/0210928 A1* | 7/2018 | Durel | G06F 16/219 |
| 2018/0253910 A1* | 9/2018 | Sherer | G06F 30/18 |
| 2018/0293288 A1* | 10/2018 | Noetzelmann | G06F 16/258 |
| 2019/0050134 A1* | 2/2019 | Grossman | G06F 3/04815 |
| 2019/0095449 A1* | 3/2019 | Uppunda | G06F 16/116 |
| 2020/0057832 A1* | 2/2020 | Barth | G06F 30/367 |
| 2021/0216533 A1* | 7/2021 | Uppunda | G06F 16/27 |

\* cited by examiner

Function-oriented decomposition   Product-oriented composition   Time

Object with a function aspect

Object with a product aspect

Object with both a product aspect and a function aspect

Function Hierarchy    Engineering Objects

Function Hierarchy    Engineering Objects

BUILDING AND TRACKING OF AN AUTOMATION ENGINEERING ENVIRONMENT

CROSS-REFERENCE TO RELATED APPLICATION

This is a U.S. national stage of application No. PCT/EP2017/078534 filed 16 May 2019, which claims priority on U.S. Provisional Application Ser. No. 62/577,598 filed Oct. 26, 2017.

BACKGROUND OF THE INVENTION

1. Field of the Invention

The present invention relates to a non-transitory computer-readable storage medium, a system and method for automatically updating a multi-hierarchal representation of the system.

2. Description of the Related Art

Design of large systems, such as a baggage handling system, is a multi-disciplinary project. As an example, the baggage handling system combines automation information (e.g., within the automation discipline), mechanical information (e.g., within the mechanical discipline), and electrical information (e.g., within the electrical discipline).

Traditionally, engineers within each discipline work separately to design the system, and the engineers transfer data between the different disciplines manually. For example, engineers within the automation discipline transfer data to engineers within the electrical discipline via email or through complex synchronization between programs via scripting or, for example, Microsoft Excel®.

The manual synchronization of the discipline specific data is very time consuming and error prone. For example, when an automation engineer introduces a new programmable logic controller (PLC) for automating the baggage handling system to a design or model (e.g., a project), this information is to be communicated to the electrical engineers, so that the electrical engineers can include the necessary electrical components within the programmable logic controller and can plan wiring. If this information is not communicated between the automation engineers and the electrical engineers or is distorted, then the designs by the automation engineers and the electrical engineers, respectively, may be negatively impacted.

The large system may be designed and modeled using, for example, Automation Designer from Siemens®. An Automation Designer project, for example, stores engineering objects that are organized in multiple hierarchies. Each of the stored engineering objects has multiple views (e.g., aspects) including, for example, a function aspect, a location aspect, a product aspect, and an automation aspect. Each of the stored engineering objects has one or more connections with other engineering objects within a discipline and/or across other disciplines. For example, an engineering object within the automation discipline has connections with other engineering objects within the automation discipline, and has connections with engineering objects within the mechanical discipline and the electrical discipline, respectively.

Each engineering object has a set of engineering properties (e.g., object properties) that are available to other engineering objects for collaboration. An object property for a first engineering object (e.g., a source object) may be linked to an object property for a second engineering object (e.g., a target object). This process involves extracting the object property from the source object and linking the object property with the target object. An engineer designing the system manually selects individual properties from the source object and the target object for linking. This process is repetitive, time consuming, and prone to error.

SUMMARY OF THE INVENTION

In view of the foregoing, it is an object of the invention to provide a method in which navigation schemes that automatically search for and connect to engineering objects based on predefined relations in multi-dimensional hierarchies are defined within an engineering object of the automation project in order to react to changes within a multi-disciplinary automation project, where the engineering object also includes an intelligent extraction port that automatically extracts predefined property data from a source engineering object when the source engineering object is connected to the engineering object.

This and other object and advantages are achieved in accordance with the invention by a method for automatically updating a multi-hierarchal representation of a system includes identifying, for a first component included within the multi-hierarchal representation of the system, by a processor, a connection between the first component and a hierarchical position within the multi-hierarchal representation of the system. A memory in communication with the processor stores the defined connection between the first component and the hierarchical position within the multi-hierarchal representation of the system. The processor automatically connects the first component and a second component included within the multi-hierarchal representation of the system based on the stored connection between the first component and the hierarchical position within the multi-hierarchal representation of the system.

It is also an object of the invention to provide a non-transitory computer-readable storage medium that stores instructions executable by one or more processors to automatically update a multi-hierarchal representation of an engineering system. The instructions include defining, for a first component included within the multi-hierarchal representation of the system, one or more properties to be extracted from a type of component when the type of component is connected to the first component. The instructions also include storing, by a memory in communication with the processor, the one or more defined properties to be extracted, and automatically extracting the one or more properties from a second component when the second component is connected to the first component. A type of the second component is the same as the type of component, for which the one or more properties are defined.

It is also an object of the invention to provide a system for automatically updating a multi-hierarchal representation of an engineering system that includes a memory configured to store the multi-hierarchal representation of the engineering system. The stored multi-hierarchal representation of the engineering system includes a representation of a first component and a representation of a second component. The system further includes a processor in communication with the memory. The processor is configured to define, for the first component, a connection between the first component and a hierarchical position within the multi-hierarchal representation of the engineering system, one or more properties to be extracted from a predetermined type of component when a component of the predetermined type is connected to the first component, or a combination thereof. The processor is also configured to automatically connect the first component and the second component within the multi-hierarchal representation of the engineering system after the representation of the second component is stored in the memory, based on the defined connection between the first component and the hierarchical position within the multi-hierarchal representation of the engineering system. The processor is configured to automatically extract, after the first component and the second component are connected, the one or more properties from the second component when the second component is the same type of component as the predetermined type of component.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views. Thus, the invention will now be described in greater detail making reference to exemplary embodiments, in which.

DETAILED DESCRIPTION OF THE EXEMPLARY EMBODIMENTS

Figure 1:
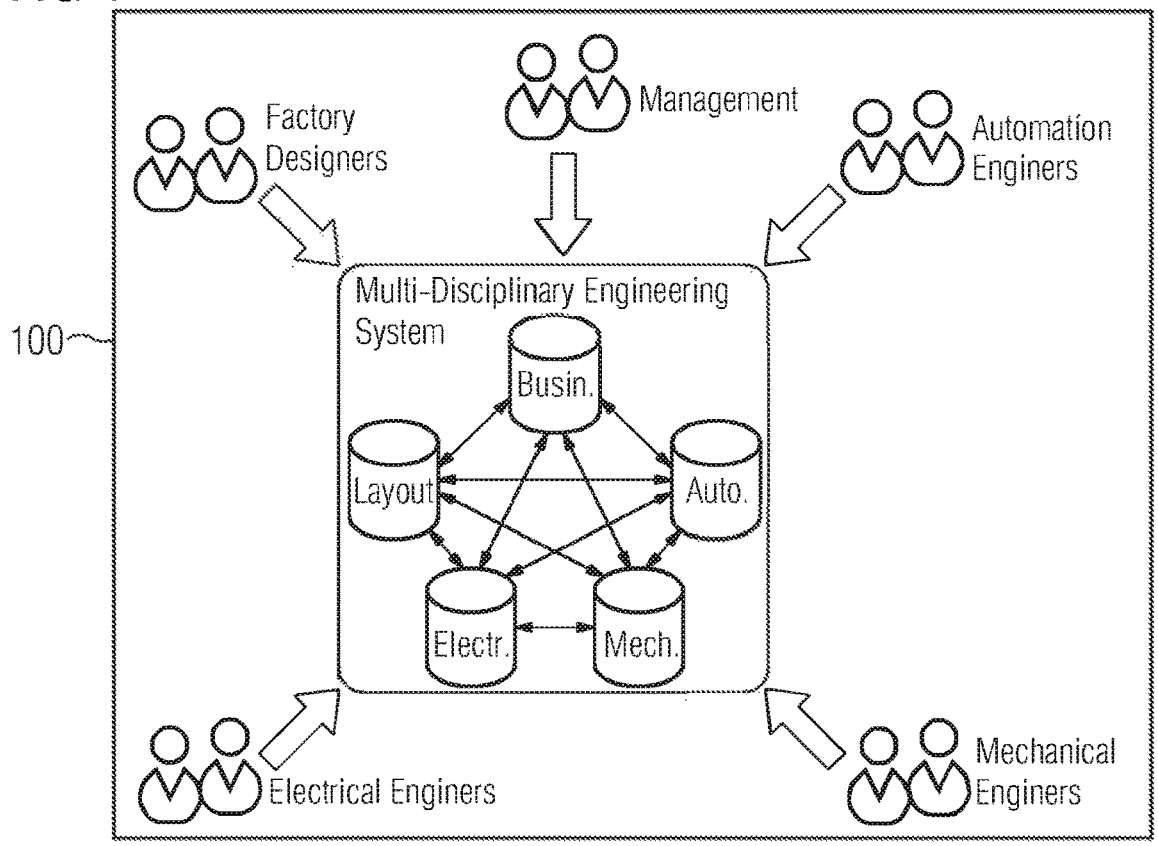
FIG. 1 illustrates an example of a multidisciplinary engineering system.

A project within an engineering design environment stores objects (e.g., engineering objects) that are organized in multiple hierarchies. Each of the engineering objects represents a device within the engineering design environment. Each of the engineering objects has multiple views (e.g., aspects of the engineering objects). For example, the multiple aspects include a function aspects, a location aspect, a product aspect, and an automation aspect. Each of the engineering objects has connections with other engineering objects within the same discipline (e.g., the automation discipline) and across other disciplines (e.g., the mechanical discipline and the electrical discipline).

As an example, due to the complex nature of the engineering objects and corresponding multi-dimensional hierarchies in automation engineering, navigation schemes that may be applied to any automation project are provided. The navigation schemes are executed in realtime and search/navigate engineering objects within the project based on relationships in the multi-dimensional hierarchies.

The navigation schemes of the present embodiments span and traverse multi-dimensional hierarchies, including vertical and horizontal relationships within the multi-dimensional hierarchies. The navigation schemes automatically react and update based on changes within the project within the engineering design environment. The navigation schemes dynamically connect engineering objects as the project is being built.

An intelligent extraction port is also provided on any target engineering object. The intelligent extraction port is used to extract the defined properties from any source object. Uon connection of a target object to a source object, the intelligent extraction port automatically extracts defined property meta-data from the connected source engineering object and updates the target engineering object with corresponding values from the source engineering object.

The intelligent extraction port may define how to extract properties from a source engineering object that does not yet exist (e.g., an engineering object that may be introduced into the project at a future time). The intelligent extraction port is thus defined in a context independent way, and the intelligent extraction port may thus be used with any project data. The intelligent extraction port extracts the properties from the source engineering object as soon as the connection is established between the source engineering object and the target engineering object in realtime.

The intelligent extraction port provides that engineering properties defined at the intelligent extraction port are extracted from the connected engineering object once available. This mechanism decouples the preparation for the usage of data external to an engineering object and availability of the external data defined in another step. In many cases, the preparation for the usage of the external data and the external data being made available are completed in different engineering phases (e.g., at different times) by people in different roles. The intelligent extraction port enhances the reusability of templates and reduces errors in data extraction.

FIG. 1 illustrates an example of a multidisciplinary engineering system 100. The multidisciplinary engineering system 100 is used by engineers, for example, who work in teams on multi-disciplinary projects. The multidisciplinary engineering system 100 represents, for example, Automation Designer from Siemens®, which is a central engineering application that focuses on reusability, rule-based engineering, cross-discipline collaboration, and data integration. The multidisciplinary engineering system 100 improves the consistency of such projects, reduces the time and cost invested in the project, and increases the productivity of the entire production engineering process.

Figure 2:
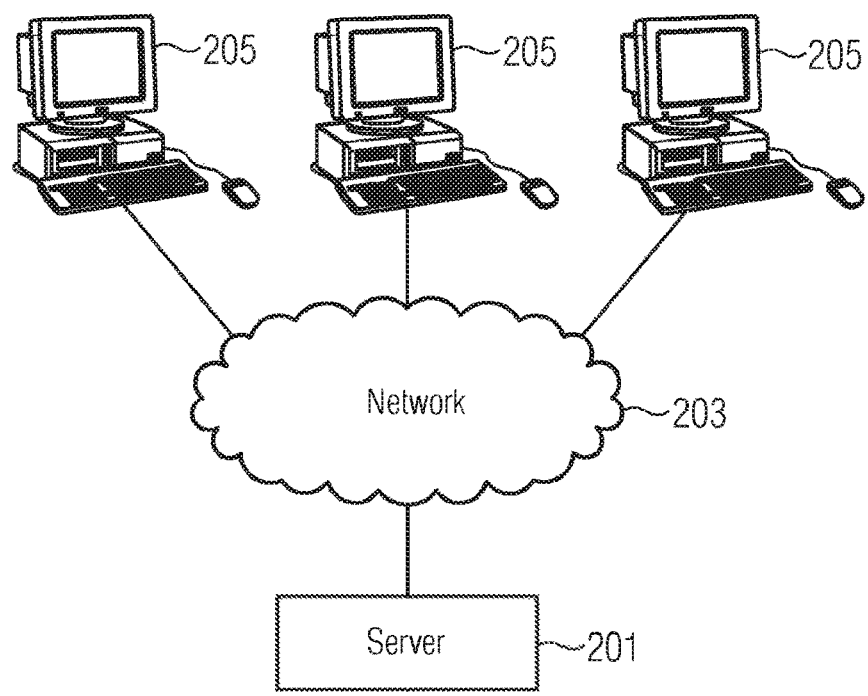
FIG. 2 illustrates an embodiment of a multidisciplinary system implementing a multidisciplinary engineering environment in accordance with the invention.

FIG. 2 illustrates an embodiment of a multidisciplinary system 200 implementing a multidisciplinary engineering environment. The multidisciplinary system 200 includes a server 201, a network 203 and workstations 205. Additional, different, or fewer components may be provided. For example, additional or fewer workstations 205 are used. As another example, additional networks and/or servers are used. In yet another example, separate databases are managed and/or accessed by the server 201 and workstations 205. Server 201 is a server computer platform having hardware such as one or more central processing units (CPU), a system memory, a random access memory (RAM) and input/output (I/O) interface(s). The server 201 is implemented on one or more server computers connected to network 203. Additional, different or fewer server components may be provided.

The workstations 205 are configured to execute at least one engineering application, such as engineering applications 305 discussed below. Alternatively, each workstation 205 may be configured to run all engineering applications, or configured to execute one engineering application per workstation 205. Additionally, the workstations 205 may be configured to execute engineering applications stored on server 201. Each engineer, designer, technician, manager and other user is provided with login credentials, such as a username and password, to access the engineering applications. Each user may access the engineering application and related information based on her role on the project, and access may be set according to permissions associated with each set of login credentials.

Figure 3:
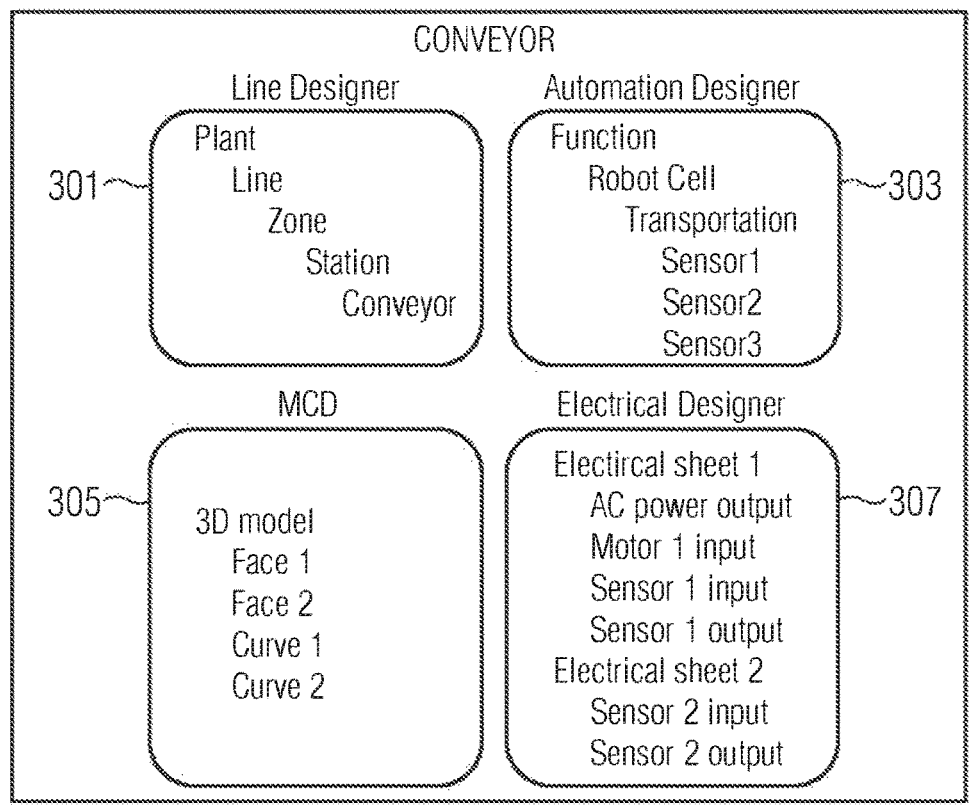
FIG. 3 illustrates another embodiment of a multidisciplinary system in accordance with the invention.

FIG. 3 illustrates another embodiment of a multidisciplinary engineering system 300. Engineered devices and other objects, such as a conveyor on a factory assembly line, are represented in the multidisciplinary system 300. The multidisciplinary engineering system 300 includes a server in communication with workstations. The server and/or workstations in the multidisciplinary engineering system 300 include engineering applications for various engineering disciplines. The engineering applications are directed to, for example, layout design, electrical design, mechanical design, automation design, and business functions. The engineering applications correspond to engineering disciplines, such as factory design, electrical engineering, mechanical engineering, automation engineering, and project management. Each engineering application presents data differently, in a manner suited for the specific engineering discipline. Additional, different, or fewer engineering applications and engineering disciplines may be provided. Alternatively, at least one of the engineering applications is directed to two or more engineering disciplines within a single application. Various engineers, designers, technicians, managers and other users access the engineering applications to complete tasks on the project. For example, in the context of an automobile factory, various engineers, designers and project managers plan a new production line for a car door assembly. FIG. 3 shows an example. The new production line includes the conveyor. Each engineering application has its own role with respect to the conveyor, and will have a representation of data associated with the conveyor specific to the engineering application.

Factory designers utilize the layout design application, such as line designer application 301, to plan the layout of the new production line, including the conveyor. The line designer application 301 displays information about which plan, line, zone, and station where the conveyor will be placed. Automation engineers utilize the automation designer application 303 to plan the conveyor automation. Automation designer application 303 displays the function and robot cell of the conveyor, and the components of the conveyor that will be automated, including sensor1, sensor2 and motor1. Mechanical engineers utilize a mechanical design application, such as MCD 305, to plan the mechanical aspects of the conveyor. MCD 305 includes information about a three-dimensional (3D) model of the conveyor, including face1, facet, curve1 and curve2. Electrical engineers utilize the electrical designer application 307 to plan the electrical inputs and outputs for the conveyor. Electrical designer application 307 displays electrical information that will be provided to technicians installing the conveyor. Electrical sheet 1 includes an AC power output, Motor1 input, Sensor1 input and Sensor1 output. Electrical sheet 2 includes a sensor2 input and sensor2 output. Additional and different roles and/or information may be provided.

Each of the engineering objects represented within the multi-disciplinary engineering system 100, 200, or 300, for example, has multiple views or aspects. The engineering objects have connections with other engineering objects within a same discipline and/or across other disciplines.

Figure 4:
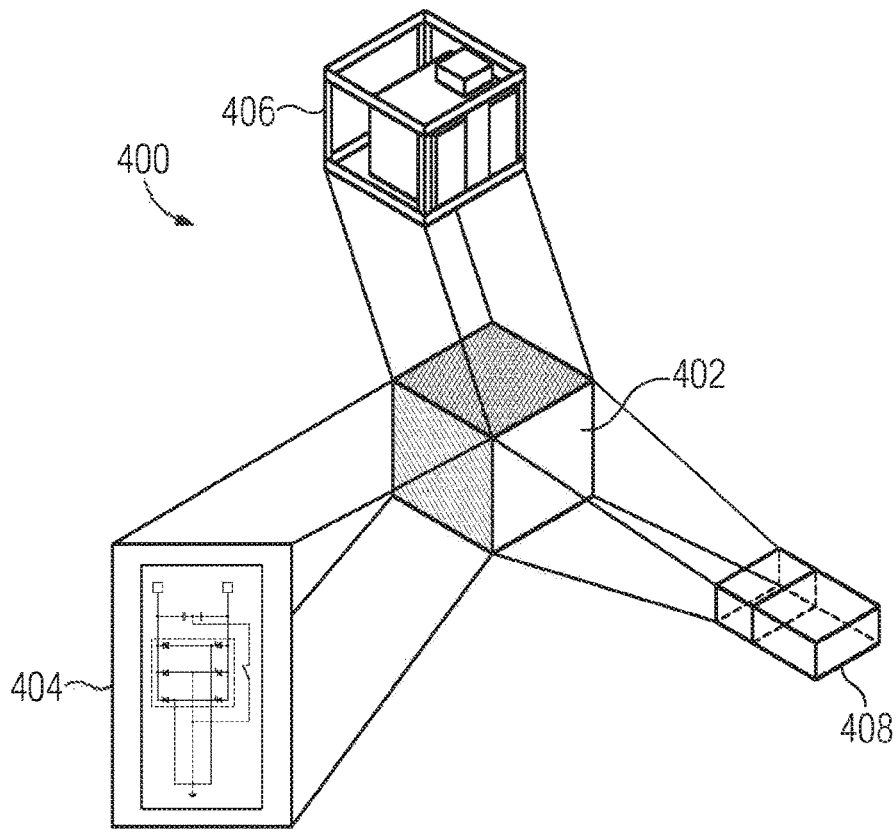
FIG. 4 illustrates another embodiment of a multidisciplinary engineering system in accordance with the invention.

FIG. 4 illustrates another example of a multidisciplinary engineering system 400. An engineering object 402 has, for example, a function aspect 404, a product aspect 406, and a location aspect 408. The engineering object 402 may have more, fewer, and/or different aspects.

The function aspect 404 is used by the engineers working on the project, for example, to highlight the functional relations among components of the engineering object 402. The product aspect 406 is used to highlight constructional relations (e.g., an assembly) of the components of the engineering object 402. The location aspect 408 is used to highlight the spatial relations among the components of the engineering object 402.

Figure 5:
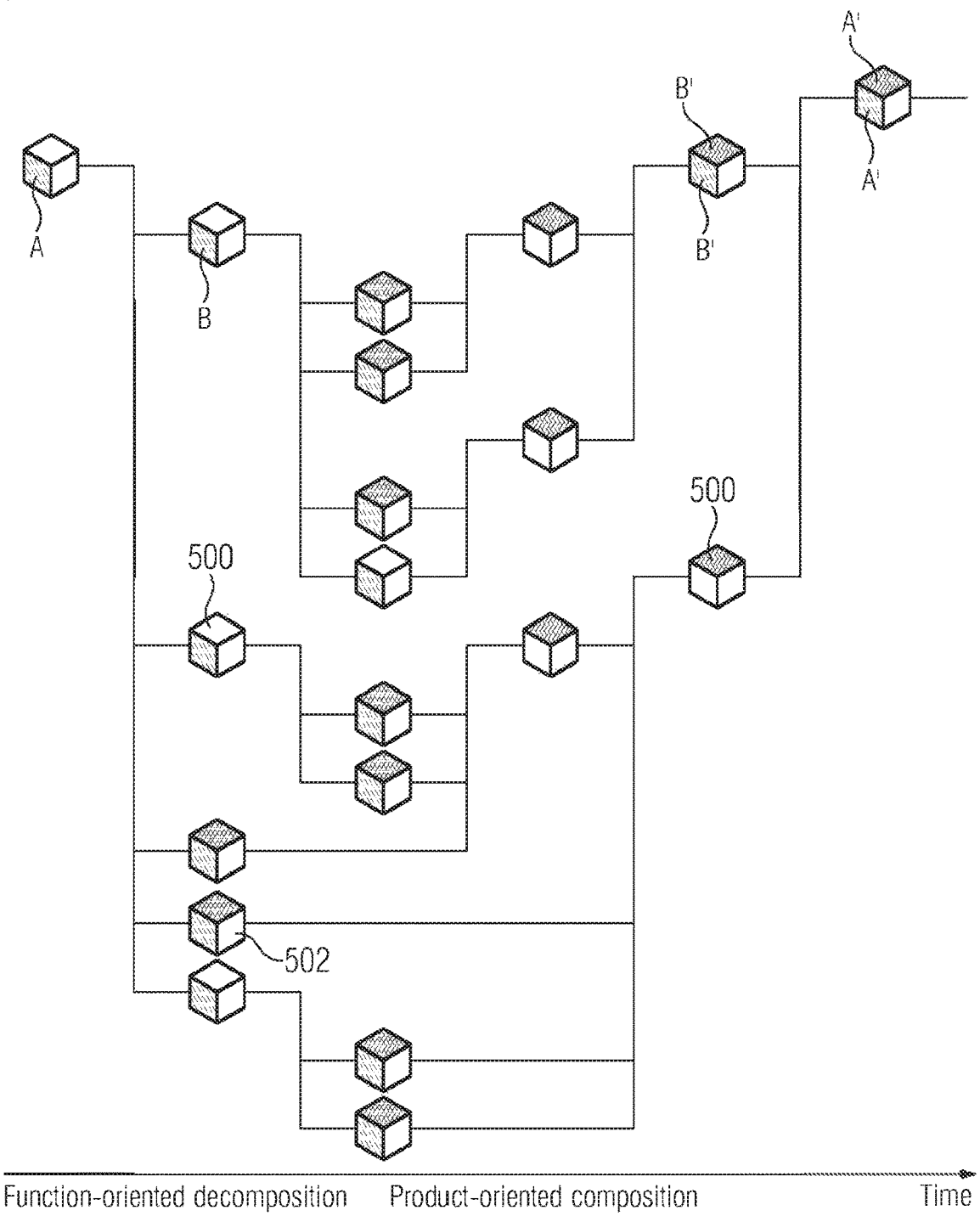
FIG. 5 illustrates an exemplary aspect organization within a multidisciplinary engineering system in accordance with the invention.
Figure 5:
Figure 5:
Figure 5:

FIG. 5 illustrates aspect organization within a multidisciplinary engineering system (e.g., the multidisciplinary engineering systems 100, 200, 300, and 400). The aspect organization provides hierarchies of engineering objects (e.g., engineering objects 402) according to, for example, international electrotechnical commission (IEC) specification 81346. Other structuring principles may be used. As shown in FIG. 5, some engineering objects 500 within the hierarchies only have a single aspect (e.g., a function aspect or a product aspect), while other engineering objects 502 within the hierarchies have multiple aspects (e.g., a function aspect and a product aspect).

Within a multidisciplinary engineering environment implemented by a multidisciplinary system, a property or engineering data (e.g., a rated power for a motor type) is to be extracted from a source engineering object for use by a target engineering object. In the prior art, however, an actual value for the property may only be extracted if the motor type (e.g., the source engineering object), for example, exists within the multidisciplinary engineering environment and is connected to the target engineering object. The presently disclosed embodiments provide navigation schemes and intelligent extraction ports for connection to and proxy data, respectively, for engineering objects to be placed within the multidisciplinary engineering environment in the future.

Figure 6:
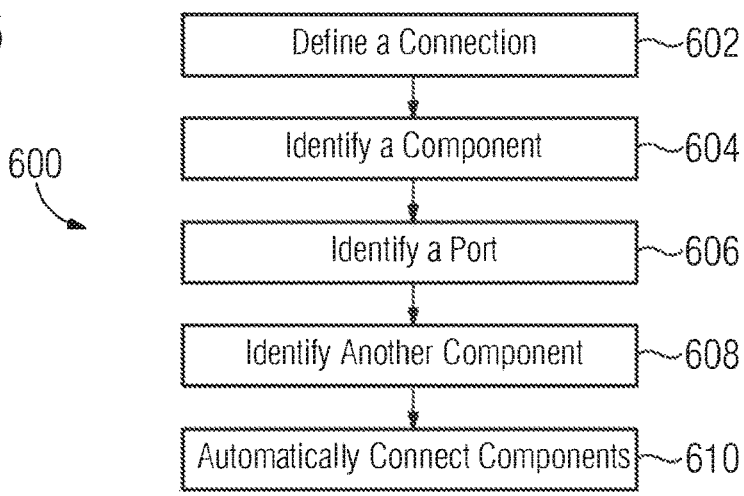
FIG. 6 is a flow chart of one embodiment of a method for automatically updating a multi-hierarchal representation of a system in accordance with the invention.

FIG. 6 is a flowchart of one embodiment of a method 600 for automatically updating a multi-hierarchal representation of a system. The system may be an engineering system, such as a baggage handling system. Other engineering systems may be represented. The method 600 is performed in the order shown or other orders. Additional, different, or fewer acts may be provided. For example, the method may be performed without steps 606 and/or 608.

In one embodiment, the multi-hierarchal representation of the system includes at least a first representation of the system and a second representation of the system. For example, the first representation of the system is a representation within a first discipline and the second representation of the system is a representation within a second discipline. The first discipline is, for example, different than the second discipline. As an example, the first discipline is mechanical engineering, electrical engineering, or automation engineering, and the second discipline is mechanical engineering, electrical engineering, or automation engineering. The multi-hierarchal representation of the system may include more or fewer representations of the system. For example, the multi-hierarchal representation of the system may include a third representation of the system within a third discipline, and each of the first discipline, the second discipline, and the third discipline is a different discipline.

In step 602, a processor identifies or defines, for a first component included within the multi-hierarchal representation of the system, a connection between the first component and a hierarchical position within the multi-hierarchal representation of the system. The first component is, for example, a first engineering object within the multi-hierarchal representation of the system. The processor defining the connection between the first component and the hierarchical position may include, for example, receiving data related to the connection from a user of a multidisciplinary system or identifying the connection stored in a memory based on, for example, a type of the first component (e.g., representing a motor or a sensor). The processor may be a processor of a server, a workstation, another computing device, or may include a number of processor in communication via a network.

In one embodiment, the processor is a processor of a server. A user at a workstation in communication with the server defines the connection between the first component and the hierarchical position and transmits the defined connection to the server. In one embodiment, a memory in communication with the processor stores the defined connection between the first component and the hierarchical position within the multi-hierarchal representation of the system. The memory may be a memory of the server, another server, the workstation, another workstation, and/or another computing device. The processor of the server identifies the stored connection.

A representation of the first component includes a plurality of hierarchal views (e.g., aspects). For example, the plurality of hierarchal views include a function view, a location view, a product view, and an automation view. In one embodiment, defining the connection between the first component and the hierarchical position within the multi-hierarchal representation of the system includes identifying, by the processor, a hierarchal view of the plurality of hierarchal views.

Defining the connection between the first component and the hierarchical position within the multi-hierarchal representation of the system also includes identifying, by the processor, a number of levels to move up or down the identified hierarchal view from a first level within the identified hierarchal view to a second level within the identified hierarchal view. The first level corresponds to a level of the first component.

In one embodiment, a navigation scheme identifying the number of levels to move within the identified hierarchal view is stored with the first component. The navigation scheme may be defined by a user at a workstation in communication with the server, or the navigation may be predefined within the first component (e.g., as part of a template for the first component). The navigation scheme identifying the number of levels to move within the identified hierarchal view may be stored with the hierarchical view to be traversed at the first component, for example. The navigation scheme identifying the number of levels to move within the identified hierarchal view may be, for example, a parent navigation scheme or a "child" navigation scheme.

Figure 7:
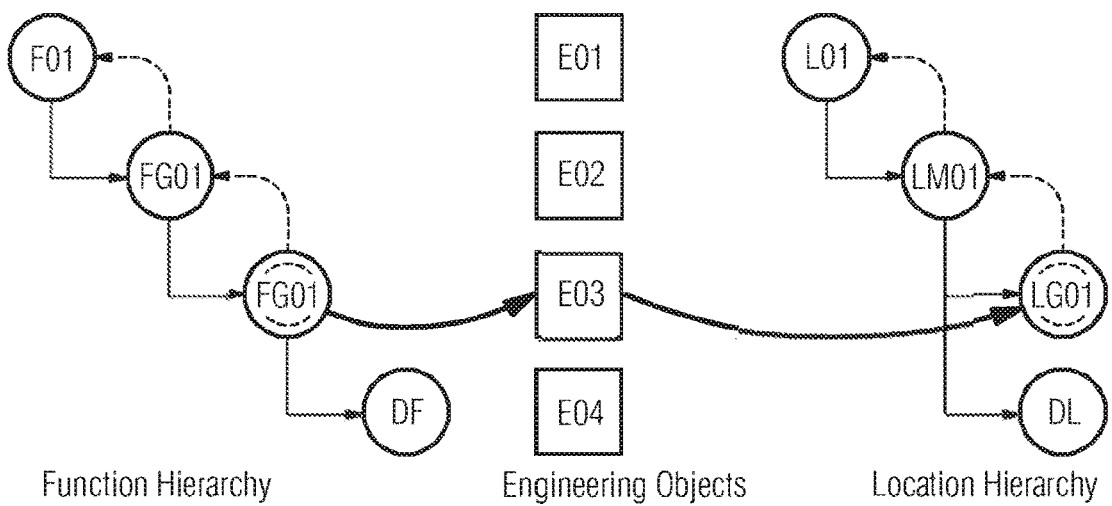
FIG. 7 illustrates an exemplary parent navigation scheme in accordance with the invention.

As shown in FIG. 7, the dotted line represents a parent navigation scheme. In the example shown in FIG. 7, an automation engineer, for example, has defined two navigation scheme objects to reach a parent that is two levels above a starting engineering object "E03" (e.g., the first component). The navigation schemes are stored at the first component, for example, but results are returned based on the aspect that is used for navigation. For example, if the function aspect is used, then the parent navigation scheme described above returns "F01" (e.g., corresponding to the second level), starting from "FG01" (e.g., corresponding to engineering object "E03"); if the location aspect is used, then "L01" is returned, starting from "LG01".

Figure 8:
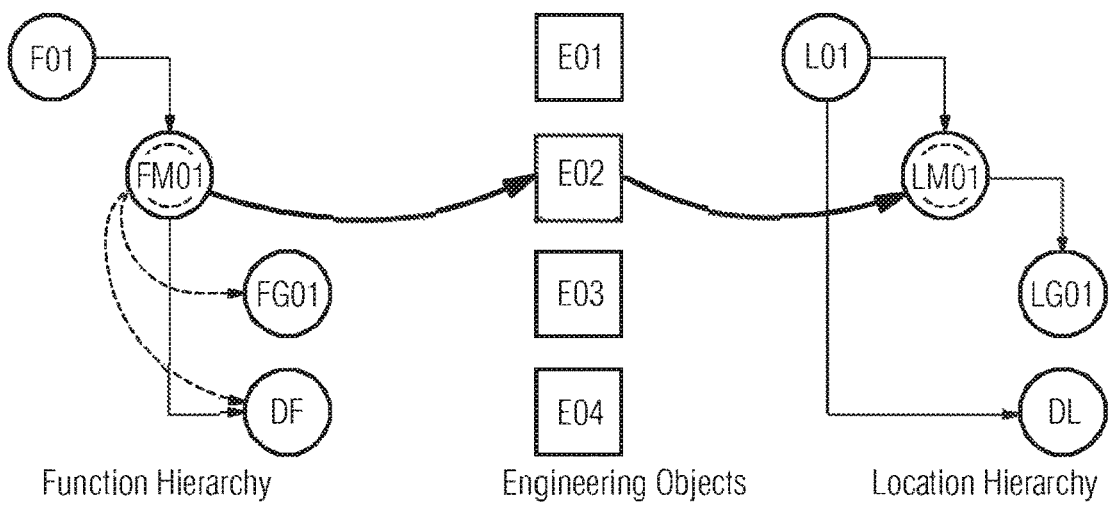
FIG. 8 illustrates an exemplary "child" navigation scheme in accordance with the invention.

As shown in FIG. 8, the dotted line represents a "child" navigation scheme. In the example shown in FIG. 8, an automation engineer, for example, has defined one navigation scheme object to reach the children that are one level below a starting engineering object "E02" (e.g., the first component). The navigation schemes are stored at the first component, for example, but results are returned based on the aspect that is used for navigation. For example, if the function aspect is used, then the above-described "child" navigation scheme returns "FG01" (e.g., corresponding to the second level) and "DF", starting from "FM01" (e.g., corresponding to engineering object "E03"); if the location aspect is used, then "LG01" and "DL" are returned, starting from "LM01".

Figure 9:
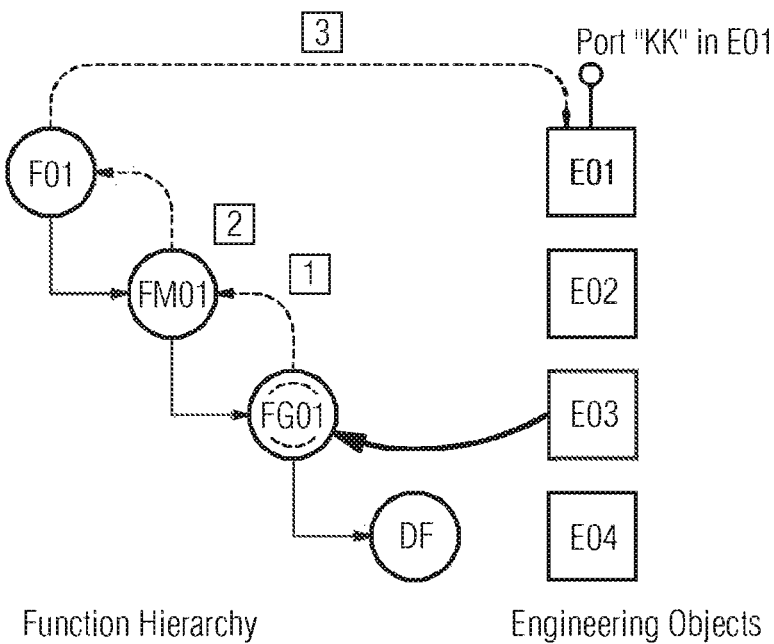
FIG. 9 illustrates an exemplary port extraction navigation scheme in accordance with the invention.

In step 604, the processor identifies a component included within the multi-hierarchal representation of the system corresponding to the second level within the hierarchal view identified within step 602. As shown in FIG. 9, the dotted lines represent two parent navigation schemes and one port extraction scheme, respectively. With reference to the function aspect, the second level within the identified hierarchal view is, for example, the parent that is two levels above the starting engineering object "E03" (e.g., "F01"). As shown in the example of FIG. 9, the component corresponding to the second level within the hierarchal view identified within step 602, is at a same level as the parent returned, "F01". In one embodiment, the component identified in step 604 is the second component.

In step 606, the processor identifies a port of the component identified in step 604. The identification of the port of the component identified in step 604 acts as a port extraction navigation scheme. In one embodiment, the first component is within the first representation of the system, and the second component, to which the first component is to be connected, is within the second representation of the system. The extracted port may be used to dynamically connect the first component (e.g., engineering object "E03") with the second component (e.g., another engineering object such as "E01"), which is within a different discipline than the first component. For example, the first component from a mechanical layout may be automatically connected with an engineering object from automation engineering.

As shown in FIG. 9, the port extraction navigation scheme extracts a port from the component identified in act 604, engineering object "E01". The port identified in act 606 is, for example, port "KK".

In step 608, the processor identifies another component within the multi-hierarchal representation of the system having the port identified in step 606. In one embodiment, the other component identified in step 608 is the second component.

Figure 10:
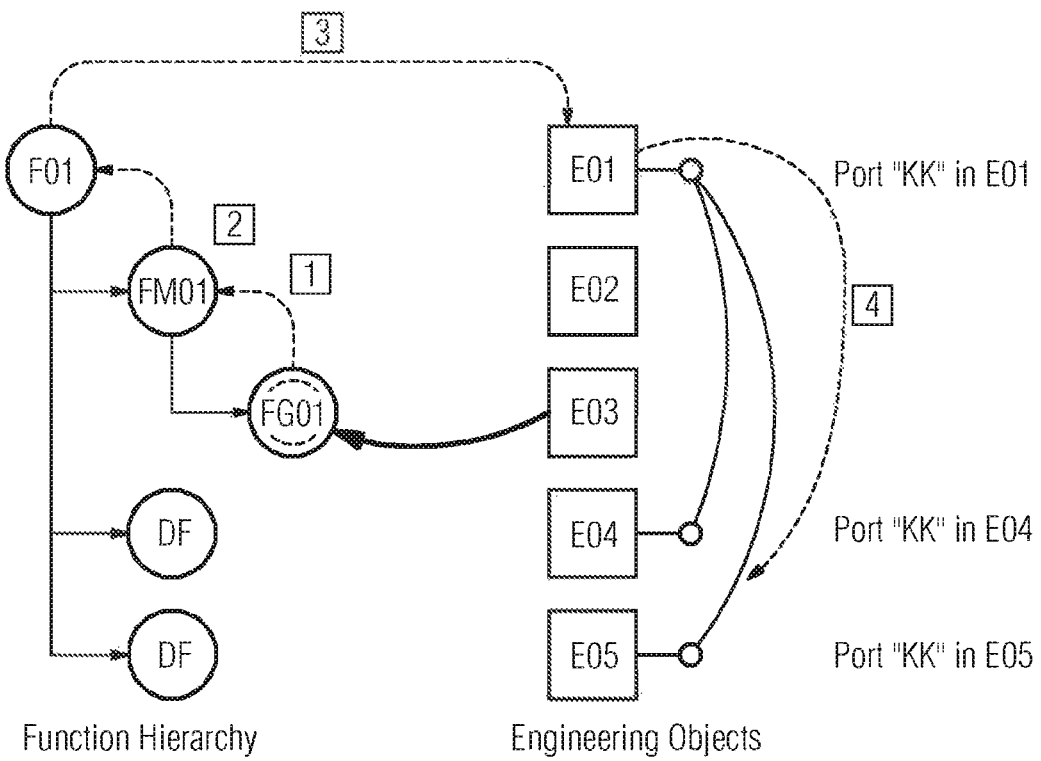
FIG. 10 illustrates an exemplary connected engineering objects navigation scheme in accordance with the invention.

FIG. 10 illustrates a connected engineering objects navigation scheme. This navigation scheme is used to extract the engineering objects that are connected to a given source engineering object (e.g., engineering object "E01" having the port "KK"). As shown in the example of FIG. 10, engineering objects "E04" and "E05" have ports "KK", respectively, and the processor, using the engineering objects navigation scheme, identifies the engineering objects "E04" and "E05" as having matching port "KK" with the port identified in act 606 for engineering object "E01".

Figure 11:
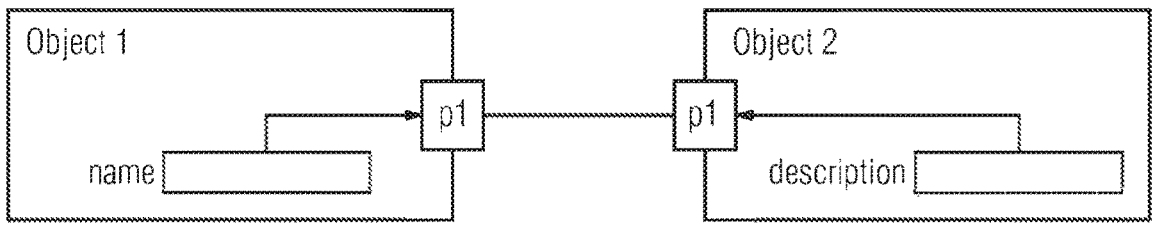
FIG. 11 illustrates an exemplary a property extraction navigation scheme in accordance with the invention.

Other navigation schemes may be provided. For example, FIG. 11 illustrates a property extraction navigation scheme. The property extraction navigation scheme is used to extract a single property from another engineering object (e.g., the second component). The property linking and value flow happens automatically upon connection.

In one embodiment, a nesting navigation scheme is provided as a reusable solution within the multi-hierarchal representation of the system. A template in a multi-disciplinary engineering system provides a scope for engineering data that may be prepared for reuse in a different engineering context (e.g., an engineering project for a baggage handling system). The different engineering disciplines may contribute data with respect to corresponding domain needs.

Templates within a multi-disciplinary engineering system provide that engineering objects may be grouped as a template in a discipline, and linked with corresponding data in other applications and/or disciplines. A collection of engineering objects are thus identifiable across all of the disciplines within the multi-disciplinary engineering system.

Figure 12:
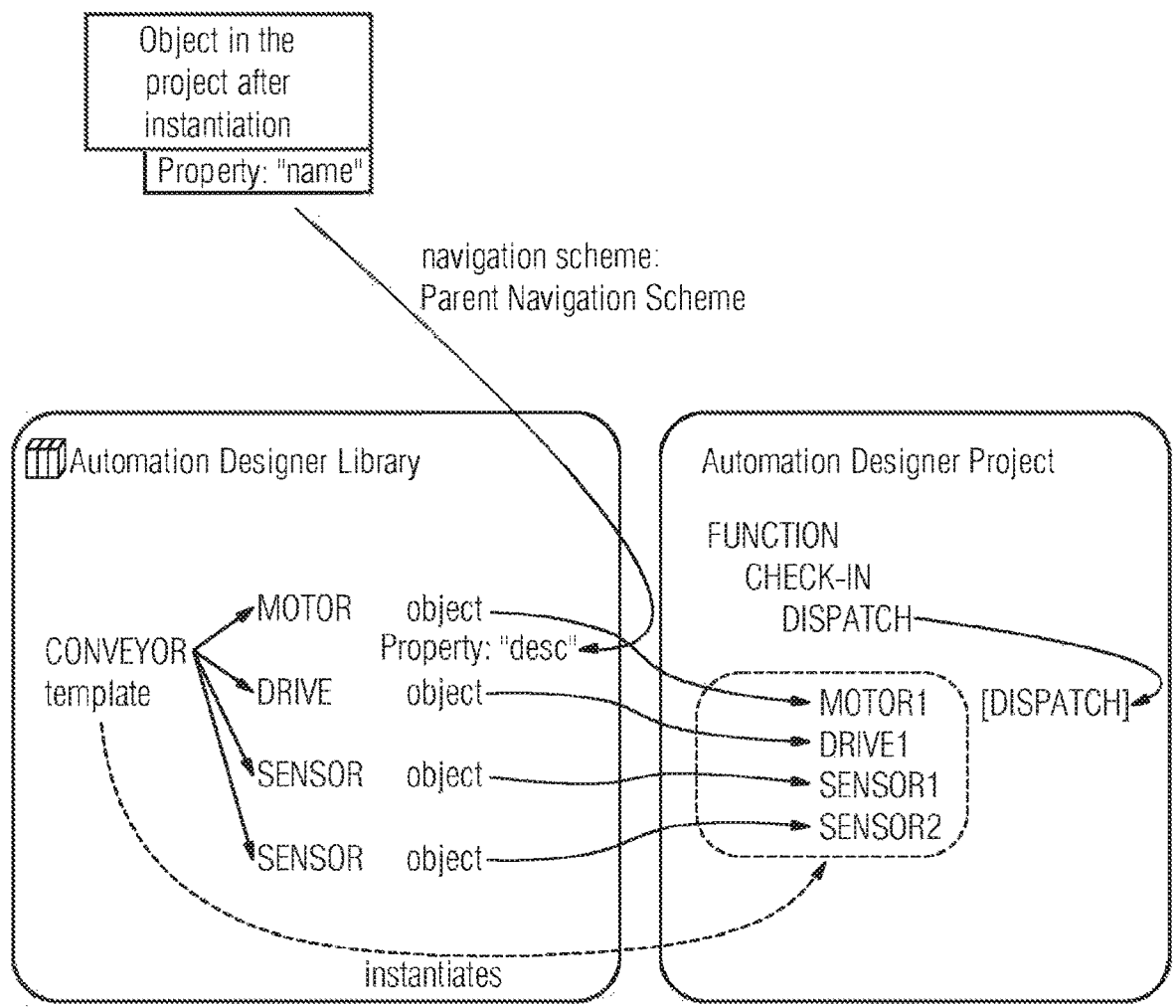
FIG. 12 illustrates exemplary template creation and instantiation with navigation schemes in accordance with the invention.

FIG. 12 illustrates exemplary template creation and instantiation with navigation schemes. In a standard workflow, an automation engineer creates, for example, a template for a conveyor with a motor, a drive, and sensors in a defined order. Templates may be created for other devices within the multi-disciplinary engineering system. When a template is instantiated within a discipline, all the corresponding linked library templates of the other disciplines, which are stored in the memory or another memory, for example, and corresponding stored navigation schemes are also instantiated. The processor automatically finds and evaluates the navigation schemes and updates values for the engineering objects within the multi-disciplinary engineering system as engineering objects are added.

Figure 13:
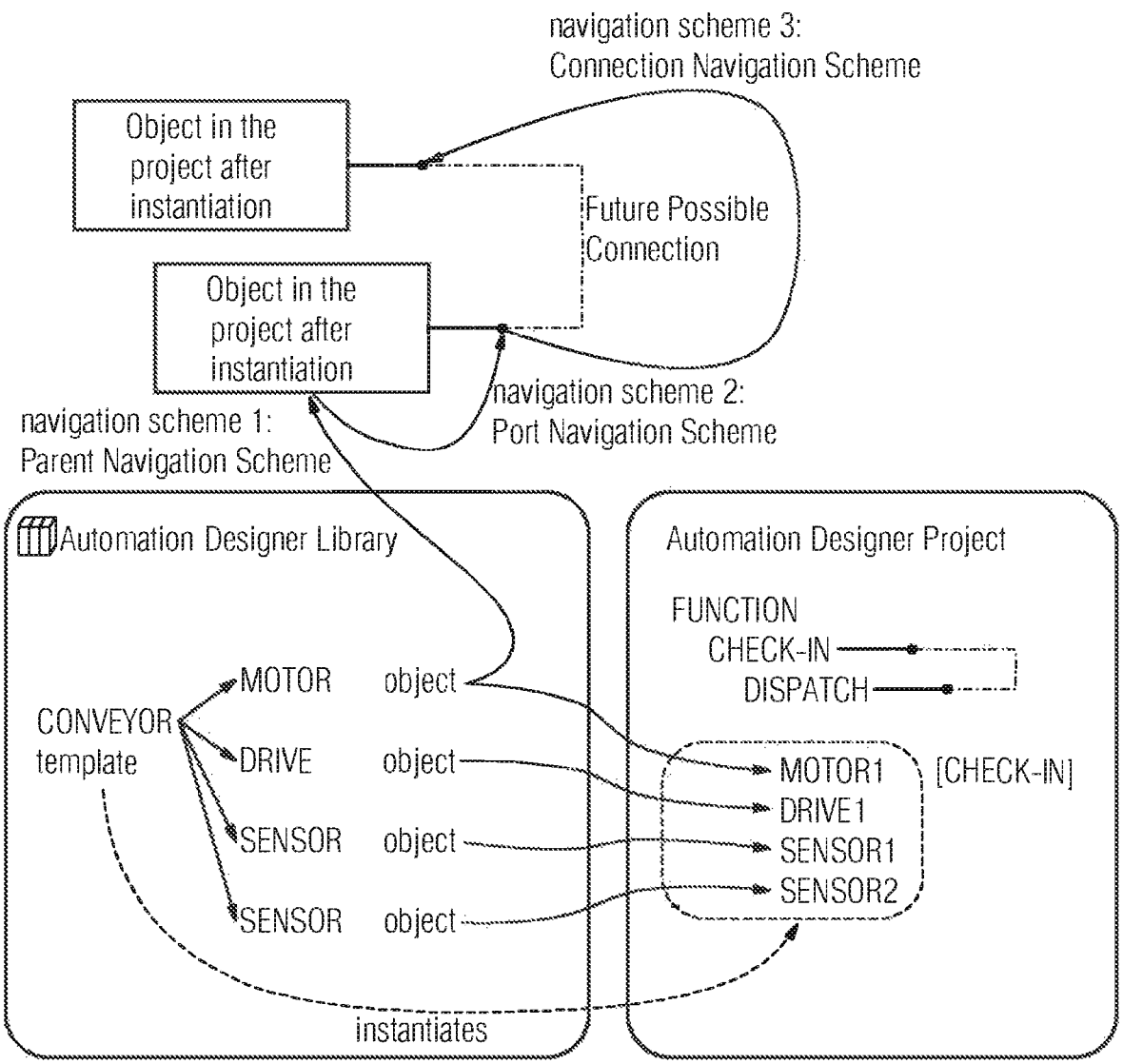
FIG. 13 illustrates exemplary template creation and instantiation with nested navigation schemes in accordance with the invention.

FIG. 13 illustrates how navigation schemes may be nested, and results from the navigation schemes may be used to create a next navigation scheme.

In step 610, the processor automatically connects the first component and the second component included within the multi-hierarchal representation of the system based on the defined connection between the first component and the hierarchical position within the multi-hierarchal representation of the system. In one embodiment, the second component is not yet included within the multi-hierarchal representation of the system when the connection between the first component and the hierarchal position within the multi-hierarchal representation of the system is defined. In one embodiment, the first component and the second component are already connected, and in step 610, the first component and the second component automatically communicate with each other using the navigation schemes described above.

Due to the automatic connection of the first component and the second component in act 610, data may be shared between the first component and the second component. For example, a mechanical engineering works with the first component within a first application at a first workstation, and an electrical engineer works with the second component within a second application at a second workstation in communication with the first workstation via a server and a network. Due to the connection in step 610, data needed by the electrical engineer at the second workstation may be automatically transmitted from the first workstation and/or the processor of the server.

Other navigation schemes may be defined at the first component, for example. As an example, a property extraction navigation scheme may be defined at the first component. The property extraction navigation scheme is used to extract a single property from an engineering object. Property linking and value flow happens automatically upon connection.

In one embodiment, the navigation schemes automatically generate calling sequences of program blocks that are to be executed based on the automation engineering structure, for example. The navigation schemes automatically create, for example, PLC program blocks that may be exported and executed in a totally integrated automation (TIA) portal. The navigation schemes adapt and change the PLC program and call the hierarchy automatically by reacting to changes in the engineering environment.

Many sensors and actuators are represented by tags (e.g., global variables) in PLC programs, and the sensors and actuators are to have unique names within the scope of the programmable logic controller (PLC). Many of the tags are parts of reusable solutions (e.g., templates) that are instantiated a number of times. In one embodiment, to provide a unique name for tags, formulas that derive a unique name from an aspect structure, for example, may be used. Relative navigation is used to identify all ancestors of a tag located somewhere within an aspect structure to derive a valid name.

Program blocks are used in templates and represent a part of the PLC program. The program blocks are to be parameterized regarding individual and automation components (e.g., sensors and actuators). Relations within the template may be set by absolute relations, but relations to external target engineering objects (e.g., the second component in a different discipline) are defined by using relative navigations. This provides that connections are created dynamically once the template is used, moved, or copied in a project context.

One or more of the present embodiments provide a set of navigation schemes used to traverse multi-hierarchy structure of an automation project. The navigation schemes may be applied in isolation or may be nested together such that the navigation schemes are applied in a specific order.

Figure 14:
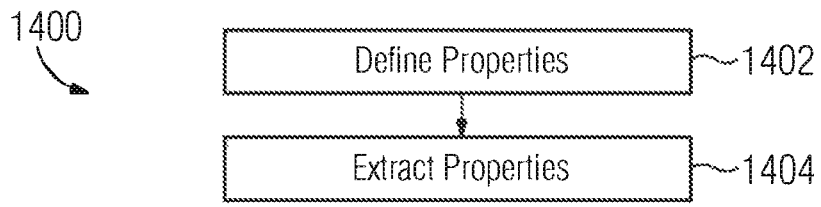
FIG. 14 illustrates a flow chart of one embodiment of a method for automatically updating a multi-hierarchal representation of a system in accordance with the invention.

FIG. 14 is a flowchart of one embodiment of a method 1400 for automatically updating a multi-hierarchal representation of a system. The system may be an engineering system, such as a baggage handling system. Other engineering systems may be represented. The method 1400 is performed in the order shown or other orders. Additional, different, or fewer acts may be provided. The method 1400 may be performed in parallel with, in series with, or without the method 600.

Figure 15:
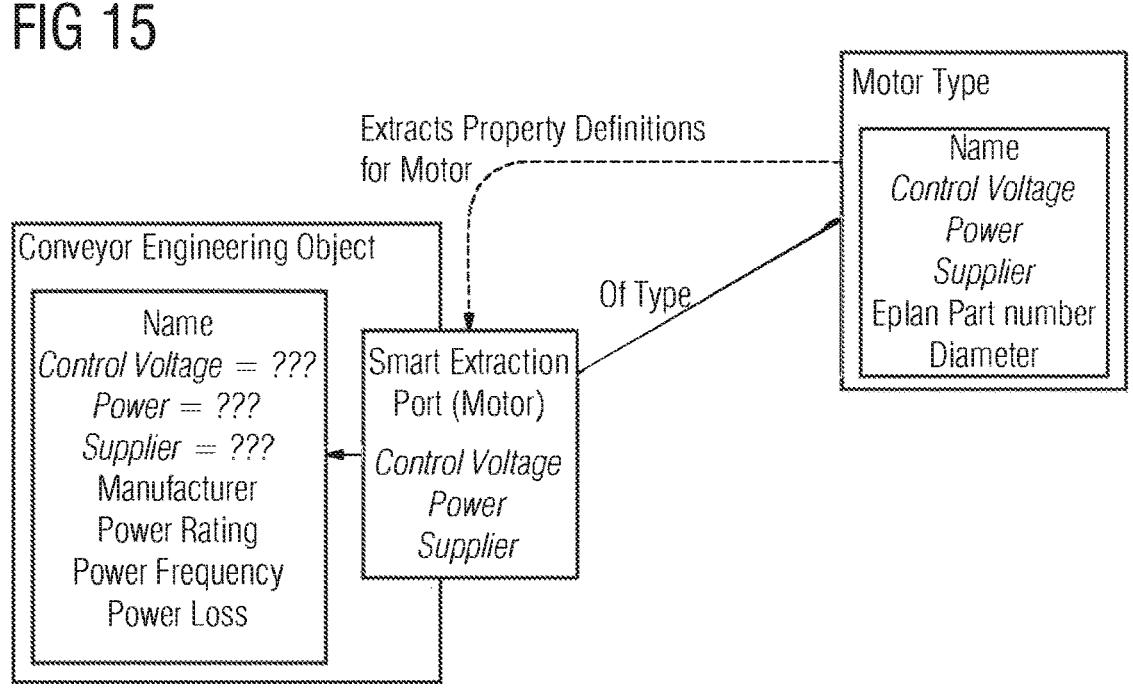
FIG. 15 illustrates an exemplary intelligent extraction port in accordance with the invention.
Figure 16:
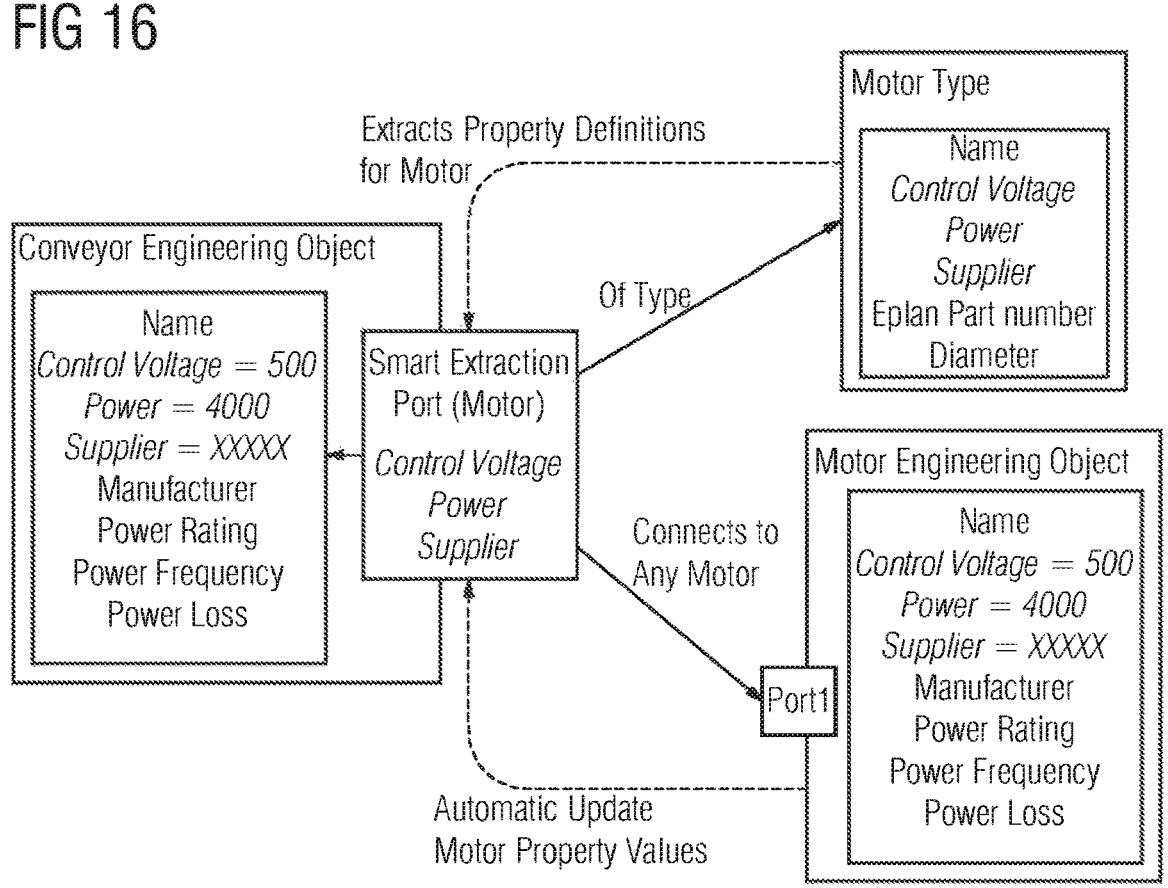
FIG. 16 illustrates an exemplary intelligent extraction port in accordance with the invention.
Figure 17:
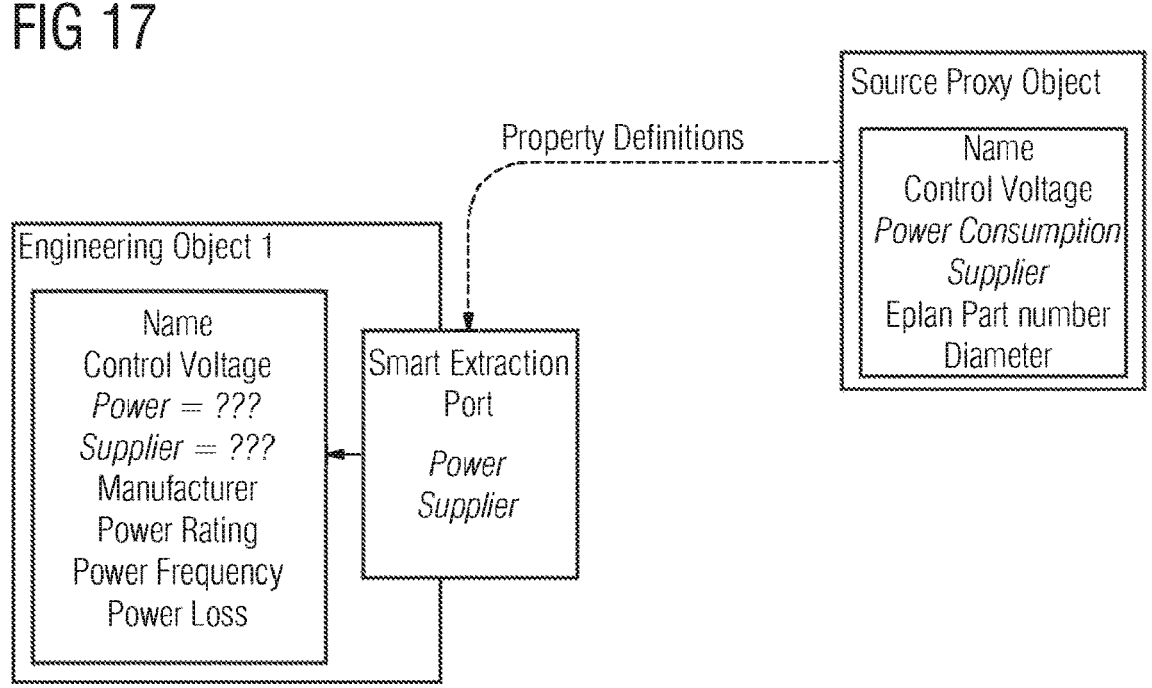
FIG. 17 illustrates an exemplary intelligent extraction port in accordance with the invention.
Figure 18:
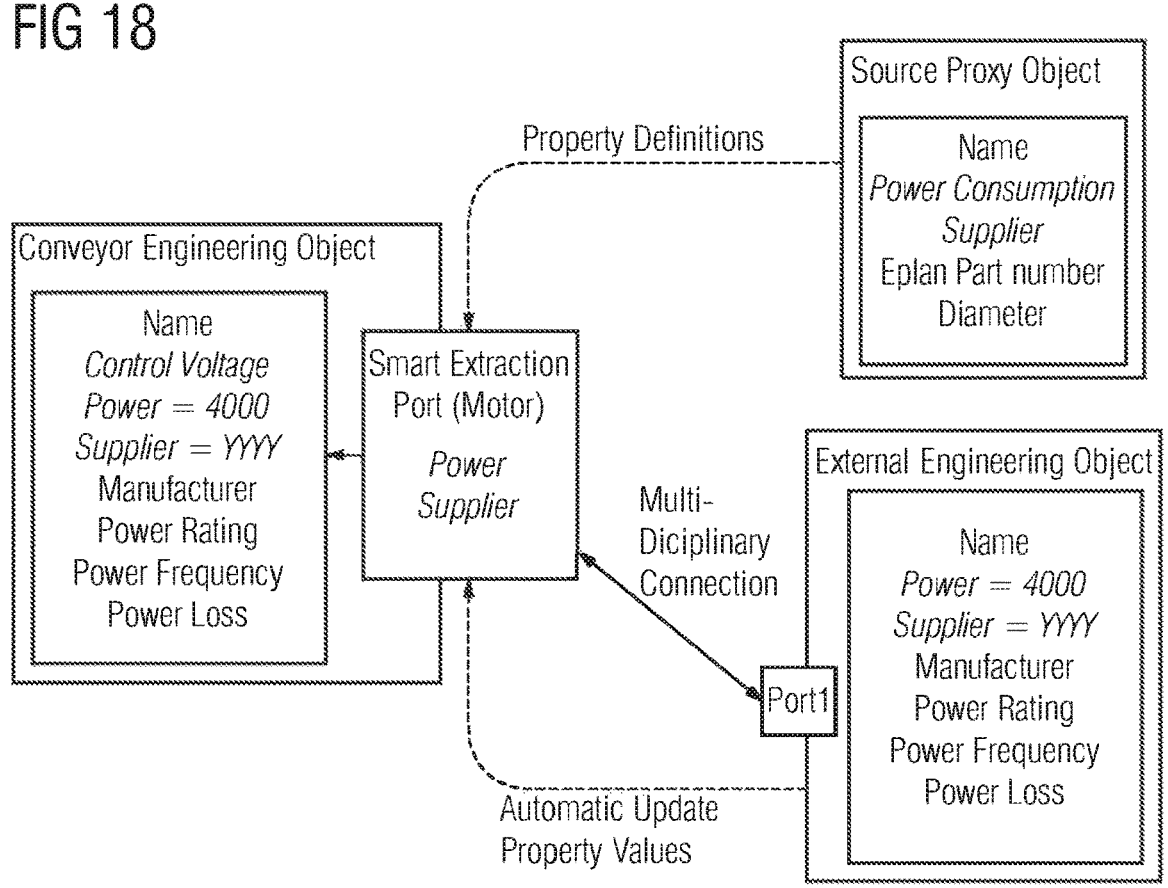
FIG. 18 illustrates an exemplary intelligent extraction port in accordance with the invention.

In step 1402, a processor defines, for a first component included within the multi-hierarchal representation of the system, one or more properties to be extracted from a type of component when the type of component is connected to the first component. In other words, the processor generates an intelligent extraction port. As shown in FIG. 15, the intelligent extraction port extracts, for example, control voltage, power, and supplier information from any connected motor. Different properties may be extracted, and/or different engineering objects types (e.g., component types) to be connected may be defined. In one embodiment, a memory in communication with the processor stores the one or more defined properties to be extracted. For example, the processor is a processor of a server, and the server stores the one or more defined properties to be extracted.

In step 1404, the processor automatically extracts the one or more properties from a second component when the second component is connected to the first component (e.g., with the method 600). A type of the second component is the same as the type of component, for which the one or more properties are defined.

The defined properties may only be extracted if the first component is connected to, for example, the defined type of component. For example, with reference to the example discussed above, the processor only extracts the defined properties when the first component is connected to a motor within the multi-hierarchal representation of the system.

Referring to FIGS. 15-18, as soon as the intelligent extraction port is connected to a motor instance (e.g., in accordance with the method 600 shown in FIG. 6), the intelligent extraction port, via the processor, automatically extracts, for example, the property values for control voltage, power, and supplier from the source engineering object (e.g., the second component) and updates the linked property values of the target engineering object (e.g., the first component, representing a conveyor) in realtime. The intelligent extraction port may extract information (e.g., the property values) from engineering objects of other engineering disciplines such as, for example, mechanical engineering, electrical engineering, automation engineering, and/or other engineering disciplines. The intelligent extraction port is generic in that the intelligent extraction port may be applied to engineering objects within the same and different engineering disciplines.

In one embodiment, the multi-hierarchal representation of the system includes at least a first representation of the system and a second representation of the system. The first representation of the system is a representation within a first discipline, and the second representation of the system is a representation within a second discipline. The first discipline is different than the second discipline. The first discipline is, for example, mechanical engineering, electrical engineering, or automation engineering, and the second discipline is, for example, mechanical engineering, electrical engineering, or automation engineering. More, fewer, and/or different representations within more, fewer, and/or different disciplines may be provided for the multi-hierarchal representation of the system.

In one embodiment, the second component is not yet included within the multi-hierarchal representation of the system when the one or more properties to be extracted are defined. In other words, the connection between the first component and the second component will happen in the future, and the intelligent extraction port automatically extracts the defined property meta-data from the connected source engineering object and updates the target engineering object with the values from the source engineering object when the source engineering object is placed and/or defined within the multi-hierarchal representation of the system.

One or more of the presently disclosed embodiments provide an intelligent extraction port on a target engineering object to extract defined properties from any source engineering object within a multi-hierarchal representation of a system. The intelligent extraction port is stored with the target engineering object. Once a source engineering object of a particular type is connected to the target engineering object within the multi-hierarchal representation of the system, the intelligent extraction port automatically extracts the defined property meta-data from the connected source engineering object and updates the target engineering object with the values from the source engineering object.

The intelligent extraction port may define how to extract properties from a source engineering object that is not yet included within the multi-hierarchal representation of the system. As a result, a design engineer can prepare data exchanges in an engineering environment with nested objects without the need for specific engineering objects already being included within the engineering environment. The intelligent extraction port provides that engineering properties defined at the intelligent extraction port will be extracted from the connected engineering object once the connected engineering object is available. This mechanism decouples the preparation for the usage of external data and availability of the external data defined in another step of the design process. This approach enhances the reusability of solutions (e.g., templates) and reduces errors.

Figure 19:
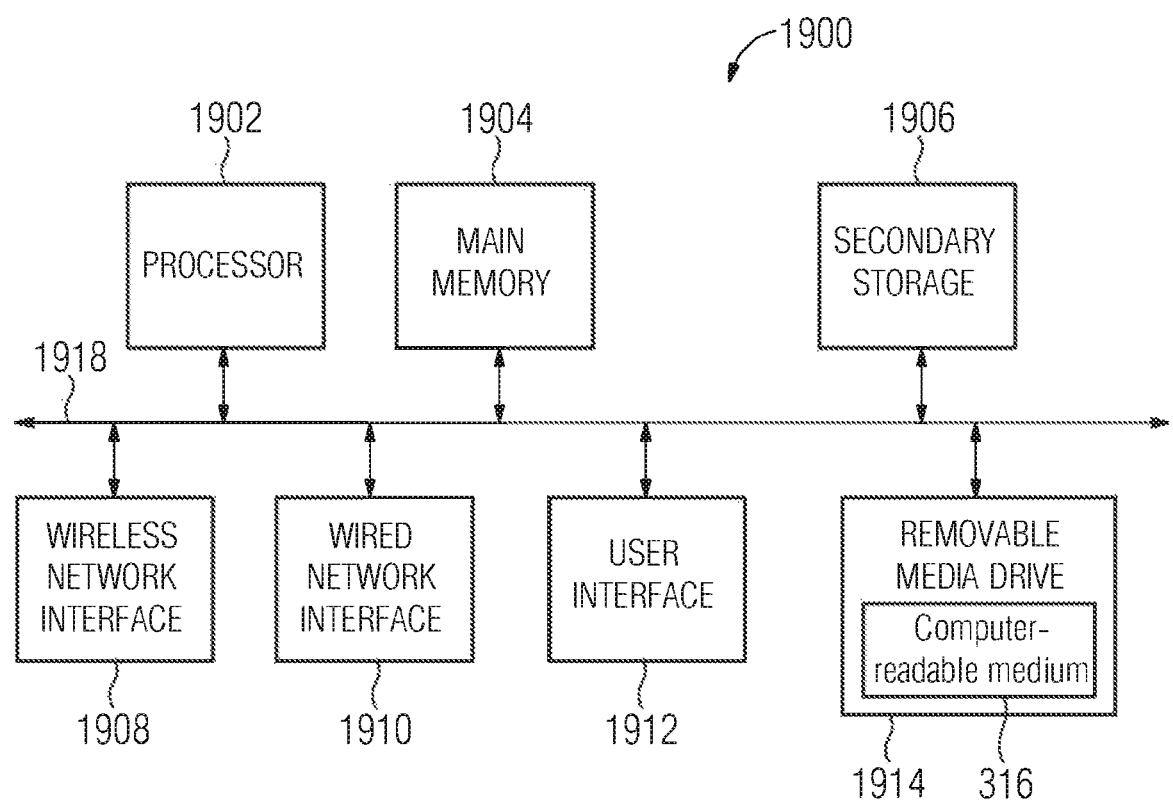
FIG. 19 is a schematic illustration of a system for building and tracking an automation engineering environment in accordance with an embodiment of the invention.

FIG. 19 shows one embodiment of at least part of a system for building and tracking an automation engineering environment. The system is shown as a simplified block diagram of an example apparatus 1900. The system is a personal computer, laptop, tablet, workstation, mainframe, server, smart phone, or other computer device. The apparatus 1900 includes software and/or hardware to perform any one or more of the activities or operations described herein.

The apparatus 1900 includes a processor 1902, a main memory 1904, secondary storage 1906, a wireless network interface 1908, a wired network interface 1910, a user interface 1912, and a removable media drive 1914 including a computer-readable medium 1916. A bus 1918, such as a system bus and a memory bus, may provide electronic communication between the processor 1902 and the other components, memory, drives, and interfaces of apparatus 1900.

Additional, different, or fewer components may be provided. The components are intended for illustrative purposes and are not meant to imply architectural limitations of network devices. For example, the apparatus 1900 may include another processor and/or may not include the secondary storage 1906 or removable media drive 1914. As another example, the apparatus 1900 connects with a camera, sensor and/or microphone.

Instructions embodying the acts or functions described herein may be stored on one or more external computer-readable media 1916, in main memory 1904, in the secondary storage 1906, or in the cache memory of processor 1902 of the apparatus 1900. These memory elements of apparatus 1900 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any non-transitory medium that is capable of storing instructions for execution by apparatus 1900 that cause the machine to perform any one or more of the activities disclosed herein.

The instructions stored on the memory as logic may be executed by the processor 1902. The functions, steps or tasks illustrated in the figures or described herein are executed in response to one or more sets of instructions comprising computer program code stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory (e.g., external computer-readable media 1916, in main memory 1904, in the secondary storage 1906, or in the cache memory of processor 1902) also stores pre-calculated information, numerical models, matrices, and data calculated during processing.

The wireless and wired network interfaces 1908 and 1910 may be provided to enable electronic communication between the apparatus 1900 and other network devices via one or more networks. In one example, the wireless network interface 1908 includes a wireless network interface controller (WNIC) with suitable transmitting and receiving components, such as transceivers, for wirelessly communicating within the network. In another example, the wireless network interface 1908 is a cellular communications interface. The wired network interface 1910 may enable the apparatus 1900 to physically connect to a network by a wire, such as an Ethernet cable. Both wireless and wired network interfaces 1908 and 1910 may be configured to facilitate communications using suitable communication protocols, such as the Internet Protocol Suite (TCP/IP).

The processor 1902, which may also be a central processing unit (CPU), is any general or special-purpose processor capable of executing machine readable instructions and performing operations on data as instructed by the machine readable instructions. The main memory 1904 or other memory may be accessible to processor 1902 for accessing machine instructions and may be in the form of random access memory (RAM) or any type of dynamic storage (e.g., dynamic random access memory (DRAM)). The secondary storage 1906 may be any non-volatile memory, such as a hard disk, which is capable of storing electronic data including executable software files. Externally stored electronic data may be provided to the apparatus 1900 through one or more removable media drives 1914, which may be configured to receive any type of external media, such as compact discs (CDs), digital video discs (DVDs), flash drives, external hard drives, or any other external media.

The processor 1902 is configured by the instructions and/or hardware.

A user interface 1912 may be provided in none, some, or all devices to allow a user to interact with the apparatus 1900. The user interface 1912 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for audio), camera, buttons, and/or touch pad. In other embodiments, only the display (e.g., touch screen) is provided. The display portion of the user interface receives images, graphics, text, quantities, or other information from the processor 1902 or memory.

Additional hardware may be coupled to the processor 1902 of the apparatus 1900. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The apparatus 1900 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in apparatus 1900 to appropriately manage the operation of the hardware components therein.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for automatically updating a multi-hierarchal representation of a system, the method comprising:
   defining, for a first component included within the multi-hierarchal representation of the system, by a processor, a connection between the first component and a hierarchical position within the multi-hierarchal representation of the system;
   storing, by a memory in communication with the processor, the defined connection between the first component and the hierarchical position within the multi-hierarchal representation of the system;
   automatically connecting, by the processor, the first component and a second component included within the multi-hierarchal representation of the system based on the stored defined connection between the first component and the hierarchical position within the multi-hierarchal representation of the system.

2. The method of claim 1, wherein the second component is not included within the multi-hierarchal representation of the system when the connection between the first component and the hierarchical position within the multi-hierarchal representation of the system is identified.

3. The method of claim 1, wherein the multi-hierarchal representation of the system includes a first representation of the system and a second representation of the system, the first representation of the system being a representation within a first discipline and the second representation of the system being a representation within a second discipline, the first discipline being different than the second discipline, the first discipline being mechanical engineering, electrical engineering, or automation engineering, and the second discipline being mechanical engineering, electrical engineering, or automation engineering; and
    wherein the first component is within the first representation of the system, and the second component is within the second representation of the system.

4. The method of claim 1, wherein a representation of the first component includes a plurality of hierarchal views, the plurality of hierarchal views including a function view, a location view, a product view, and an automation view.

5. The method of claim 4, wherein identifying the connection between the first component and the hierarchical position within the multi-hierarchal representation of the system includes:
    identifying, by the processor, a hierarchal view of the plurality of hierarchal views; and
    identifying, by the processor, a number of levels to move up or down the identified hierarchal view from a first level within the identified hierarchal view to a second level within the identified hierarchal view.

6. The method of claim 5, further comprising:
    identifying, by the processor, a component included within the multi-hierarchal representation of the system corresponding to the second level within the identified hierarchal view;
    identifying, by the processor, a port of the identified component; and
    storing, by the memory, the identified port.

7. The method of claim 6, wherein the identified component is the second component.

8. The method of claim 6, wherein the component is a third component, the method further comprising:
    identifying another component within the multi-hierarchal representation of the system having the identified port, the other component being the second component.

9. The method of claim 1, further comprising:
    defining, by the processor, at least one property to be extracted for a type of component when the type of component is connected to the first component; and
    storing, by the memory, one or more defined properties to be extracted.

10. The method of claim 9, wherein the at least property to be extracted includes one of (i) a control voltage, (ii) a power, (iii) a supplier, (iv) a manufacturer, (v) a power rating, (vi) a power frequency and (vii) a power loss, or any combination thereof.

11. The method of claim 9, wherein the type of component is one of (i) a motor, (ii) a drive, (iii) a sensor, (iv) a checking line and (v) a conveyor.

12. The method of claim 9, further comprising:
    automatically extracting, by the processor, the one or more properties from the second component after the second component is automatically connected to the first component, a type of the second component being the same as the type of component, for which the one or more properties are defined.

13. The method of claim 1, wherein the processor is a processor of a server, the method further comprising:
    receiving, by the processor of the server, a representation describing the connection between the first component and the hierarchical position within the multi-hierarchal representation of the system from a first workstation in communication with the server via a network, identifying, by the processor, the connection between the first component and the hierarchical position including identifying the connection between the first component and the hierarchical position based on the received representation describing the connection between the first component and the hierarchical position; and
    communicating data representing the first component to a second workstation in communication with the server via the network based on an automatic connection of the first component and the second component.

14. The method of claim 13, wherein the received representation describing the connection between the first component and the hierarchical position is a navigation scheme.

15. A non-transitory computer-readable storage medium storing instructions which, when executed by at least one processor, causes and automatic update of a multi-hierarchal representation of an engineering system, the instructions comprising:
    program code for defining, for a first component included within the multi-hierarchal representation of the system, at least one property to be extracted from a type of component when the type of component is connected to the first component; storing, by a memory in communication with the processor, the at least one defined property to be extracted; and
    program code for automatically extracting the at least one property from a second component when the second component is connected to the first component, a type of the second component being the same as the type of component, for which the at least one property is defined.

16. The non-transitory computer-readable storage medium of claim 15, wherein the second component is not included within the multi-hierarchal representation of the system when the at least one property to be extracted is defined.

17. The non-transitory computer-readable storage medium of claim 15, wherein the instructions further comprise:
    program code for defining, for the first component, by the processor, a connection between the first component and a hierarchical position within the multi-hierarchal representation of the system;
    program code for storing, by the memory, the defined connection between the first component and the hierarchical position within the multi- hierarchal representation of the system; and
    program code for automatically connecting, by the processor, the first component and the second component within the multi-hierarchal representation of the system based on the stored connection between the first component and the hierarchical position within the multi-hierarchal representation of the system.

18. The non-transitory computer-readable storage medium of claim 15, wherein the multi-hierarchal representation of the system includes a first representation of the system and a second representation of the system, the first representation of the system being a representation within a first discipline and the second representation of the system being a representation within a second discipline, the first discipline being different than the second discipline, the first discipline being mechanical engineering, electrical engineering, or automation engineering, and the second discipline being mechanical engineering, electrical engineering, or automation engineering; and wherein the first component is within the first representation of the system, and the second component is within the second representation of the system.

19. A system for automatically updating a multi-hierarchal representation of an engineering system, the system comprising:

a memory configured to store the multi-hierarchal representation of the engineering system, the stored multi-hierarchal representation of the engineering system including a representation of a first component and a representation of a second component; and a processor in communication with the memory, the processor being configured to:

define, for the first component, a connection between the first component and a hierarchical position within the multi- hierarchal representation of the engineering system, at least one property to be extracted from a predetermined type of component when a component of the predetermined type is connected to the first component, or a combination thereof;

automatically connect the first component and the second component within the multi-hierarchal representation of the engineering system after the representation of the second component is stored in the memory, based on the defined connection between the first component and the hierarchical position within the multi-hierarchal representation of the engineering system; and automatically extract, after the first component and the second component are connected, the one or more properties from the second component when the second component is a same type of component as the predetermined type of component.

20. The system of claim 19, wherein the memory is further configured to store at least one of (i) the connection between the first component and the hierarchical position, (ii) the at least one or property to be extracted and (iii) the connection between the first component and the hierarchical position and the at least one property to be extracted.

21. The system of claim 19, wherein the at least one property to be extracted is defined before the representation of the second component is stored within the multi-hierarchal representation.

22. The system of claim 19, wherein the multi-hierarchal representation of the engineering system includes a first representation of the engineering system and a second representation of the engineering system, the first representation of the engineering system being a representation within a first discipline and the second representation of the engineering system being a representation within a second discipline, the first discipline being different than the second discipline; and wherein the first component is within the first representation of the engineering system, and the second component is within the second representation of the engineering system.

* * * * *